(12) United States Patent
Narayanan (10) Patent No.: US 12,182,892 B2
(45) Date of Patent: Dec. 31, 2024

(54) CUSTOMER IDENTIFICATION VALUE FOR ELECTRONIC DEVICES

(71) Applicant: TEXAS INSTRUMENTS INCORPORATED, Dallas, TX (US)

(72) Inventor: Naveen Ambalametil Narayanan, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 534 days.

(21) Appl. No.: 17/512,046

(22) Filed: Oct. 27, 2021

(65) Prior Publication Data

US 2023/0127425 A1    Apr. 27, 2023

(51) Int. Cl.
*G06Q 50/18* (2012.01)
*H04L 9/32* (2006.01)

(52) U.S. Cl.
CPC ......... *G06Q 50/184* (2013.01); *H04L 9/3247* (2013.01); *H04L 9/3263* (2013.01)

(58) Field of Classification Search
None
See application file for complete search history.

(56) References Cited

U.S. PATENT DOCUMENTS

| 9,632,765 | B1 * | 4/2017 | Falcone | H04L 63/0823 |
| 2012/0079287 | A1 * | 3/2012 | Leclercq | G06F 21/575 |
| | | | | 713/192 |
| 2014/0281575 | A1 * | 9/2014 | Springfield | G06F 21/72 |
| | | | | 713/189 |
| 2017/0078269 | A1 * | 3/2017 | Han | H04L 63/08 |
| 2018/0332030 | A1 * | 11/2018 | Wu | H04L 9/3263 |

FOREIGN PATENT DOCUMENTS

| EP | 3840414 | A1 * | 6/2021 | G06F 21/44 |
| JP | 07064770 | A  * | 3/1995 | |
| WO | WO-2011006282 | A1 * | 1/2011 | G06F 21/10 |
| WO | WO-2011156783 | A2 * | 12/2011 | G11B 27/102 |

* cited by examiner

*Primary Examiner* — Lance Leonard Barry (74) *Attorney, Agent, or Firm* — Michael T. Gabrik; Frank D. Cimino (57) ABSTRACT

A method is provided. In some examples, the method includes reading a first customer identification value from a first memory on a device and reading a second customer identification value from a first field in a certificate. The method also includes determining whether the first customer identification value matches the second customer identification value. In addition, the method includes reading application data from a second field in the certificate in response to determining that the first customer identification value matches the second customer identification value. The method further includes writing the application data to a second memory on the device in response to determining that the first customer identification value matches the second customer identification value.

20 Claims, 5 Drawing Sheets

CUSTOMER IDENTIFICATION VALUE FOR ELECTRONIC DEVICES

BACKGROUND

In an industrial or automotive supply chain, a tier 2 company can manufacture an electronic device for purchase by tier 1 companies. A tier 1 company that purchases electronic devices from the manufacturer can integrate one of the electronic devices into a module for use in an industrial setting or in an automobile. As one example, a tier 1 company can produce an automotive radar module using a microprocessor manufactured by a tier 2 supplier. The tier 1 company can program the microprocessor by writing application data to a memory onboard the microprocessor to an externally hosted memory in the non-volatile storage of the microprocessor. The tier 1 company may treat this application data as valuable confidential information (e.g., a trade secret) because the tier 1 company expended substantial effort to develop the application data.

The ability of the tier 1 company to generate profits from sales of modules is based on the reputation of the tier 1 company and the trust that the marketplace has for the quality and performance of the modules produced by the tier 1 company. Thus, it is important for the tier 1 company to prevent the theft of intellectual property by copycat production companies. For example, copycat production companies may not provide the same level of guarantee or warranty for the cloned modules as provided by the tier 1 company for the authorized modules, thereby flooding the marketplace with lower quality modules.

SUMMARY

In some examples, a manufacturer of devices can write a respective customer identification value to a memory onboard each of the devices. The customer identification value stored on a device may be associated with and unique to the customer that purchases that device. In other words, the identification value(s) stored on devices sold by the same manufacturer to other customers may be different than the identification value associated with the first customer. The customer can protect its application data by encrypting and authenticating that data using a key such that a malicious entity cannot write the application data to another device that stores a different customer identification value.

The techniques of this disclosure address some of the concerns that customers have about malicious entities producing cloned modules using application data of a customer. Each customer can create a digitally signed certificate having encrypted contents including the unique identification value stored on devices purchased by the customer, thereby binding the certificate to those devices. A malicious entity may be able to write the data in the certificate only to devices having an identical customer identification value stored thereon (e.g., in write-protected non-volatile memory).

In some examples, a method includes reading a first customer identification value from a first memory on a device and reading a second customer identification value from a first field in a certificate. The method also includes determining whether the first customer identification value matches the second customer identification value. In addition, the method includes reading application data from a second field in the certificate in response to determining that the first customer identification value matches the second customer identification value. The method further includes writing the application data to a second memory on the device in response to determining that the first customer identification value matches the second customer identification value.

In further examples, a computing system includes a processing resource and a non-transitory computer-readable medium coupled to the processing resource and storing instructions that, when executed by the processing resource, cause the processing resource to read a first customer identification value from a first memory on a device. The instructions are configured to be executable by the processing resource for further causing the processing resource to read a second customer identification value from a first field in a certificate and determine whether the first customer identification value matches the second customer identification value. In addition, the instructions are configured to be executable by the processing resource for also causing the processing resource to determine whether the first customer identification value matches the second customer identification value. The instructions are configured to be executable by the processing resource for also causing the processing resource to, responsive to determining that the first customer identification value matches the second customer identification value, read application data from a second field in the certificate and write the application data to a second memory on the device.

In yet further examples, a computing system includes means for reading a first customer identification value from a first memory on a device, means for reading a second customer identification value from a first field in a certificate, and means for determining whether the first customer identification value matches the second customer identification value. The computing system also includes means for reading application data from a second field in the certificate responsive to determining that the first customer identification value matches the second customer identification value. In addition, the computing system includes means for writing the application data to a second memory on the device responsive to determining that the first customer identification value matches the second customer identification value.

BRIEF DESCRIPTION OF THE DRAWINGS

Features of the present invention may be understood from the following detailed description and the accompanying drawings. In that regard.

DETAILED DESCRIPTION

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

A system-level designer may produce an electronic module such as a radar system or other computing system by programming software onto a mass-produced electronic device such as a microprocessor. To produce the electronic module for sale to a user, the system-level designer can order a large volume of components, such as electronic devices, from a second party, such as the manufacturer, and send the components and design plans to a third party, such as a production company, for assembly, programming, and other related tasks. After receiving the programmed electronic devices from the production company, the system-level designer can sell the finished modules to a user.

The production company is in possession of the design plans for the module, which means that the production company can order additional components from the same manufacturer. The production company can use the additional components to produce cloned modules to sell to users. To prevent this theft of the intellectual property of the system-level designer, the manufacturer can write an identification value to each component device that the manufacturer sells. The manufacturer can create a first unique identification value for devices purchased by a first customer and a different unique identification value devices purchased by a second customer. By tying at least some software functionality to the unique identification value for a first customer, even if the second customer obtains application data held by the first customer, the second customer may not be able to use the application data. Of course, these advantages are merely examples, and no advantage is required for any particular embodiment.

Examples of the interactions between a manufacturer, a system-level designer, and a production company are described with reference to the figures below. In that regard, FIG. 1 is a conceptual block diagram of a production environment that includes a production company 120 that builds modules for a system-level designer 110 using component devices produced by a manufacturer 100.

Figure 1:
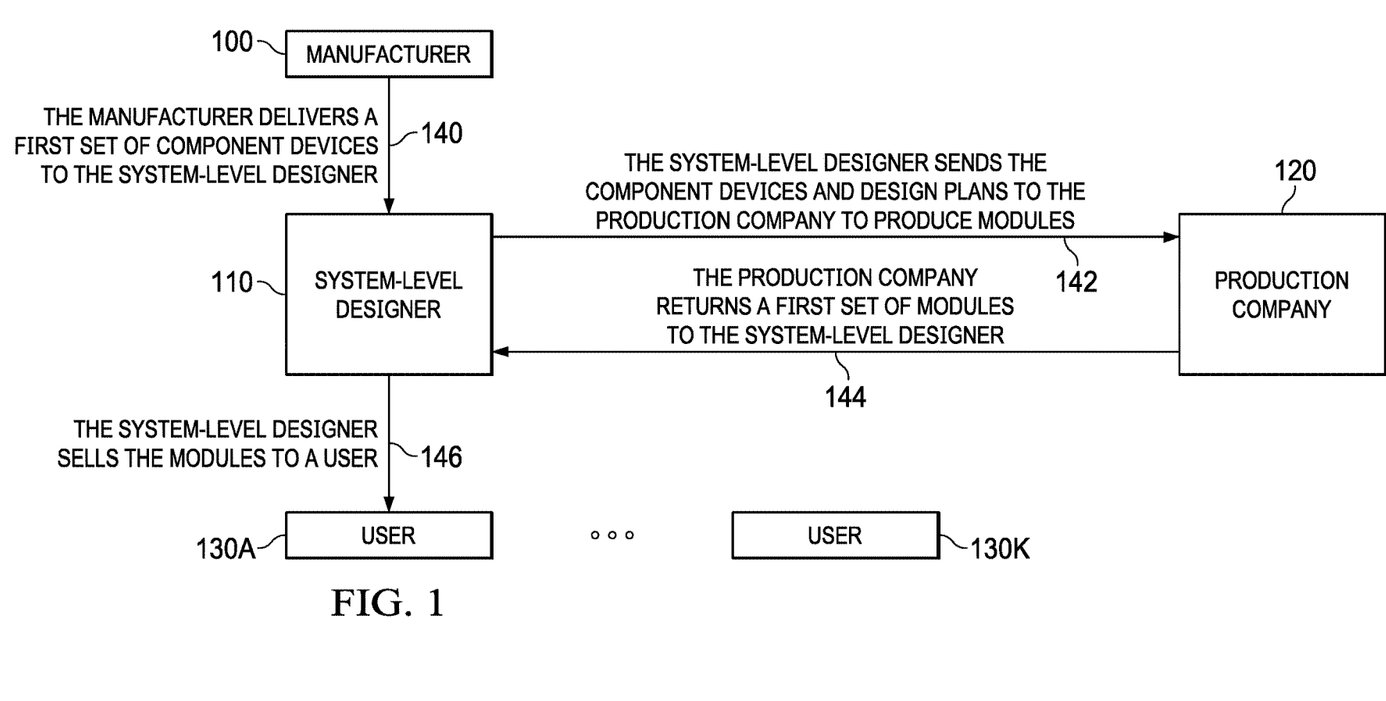
FIG. 1 is a conceptual block diagram of a production environment that includes a production company that builds modules for a system-level designer using devices produced by a manufacturer.

In the example shown in FIG. 1, manufacturer 100 produces electronic component devices such as microprocessors, microcontrollers, digital signal processors (DSPs), systems-on-chips, transistors, drivers, and/or any other electronic devices. Manufacturer 100 can sell the component devices to system-level designer 110, production company 120, and/or any of end users 130A-130N. In some examples, manufacturer 100 may sell customized component devices to any of customers 110, 120, and 130A-130N, and manufacturer 100 may also sell component devices made to a predetermined specification to any of customers 110, 120, and 130A-130N, which may be referred to as "catalog sales." Referring to line 140, manufacturer 100 delivers a first set of component devices to system-level designer 110.

System-level designer 110 may be a tier 1 company that designs and/or produces modules for users 130A-130N, who, in many examples, may be manufacturers themselves (e.g., of automobiles, aircraft, marine vessels, and/or industrial facilities). Additionally or alternatively, some of users 130A-130N may be end users, such as consumers who purchase radar systems or communication systems to install on their marine vessels or aircraft. System-level designer 110 receives the first set of component devices from manufacturer 100 and can generate design plans that utilize the first set of component devices in a manufactured product. For example, system-level designer 110 can generate design plans to integrate each of the component devices into a respective module. In some examples, the design plans may call for integrating more than one component device into each module. The design plans may also include application data that will be written to the memory of each of the component devices. System-level designer 110 may also add value to the component devices by developing one or more application to run on each of the component devices. Referring to line 142, system-level designer 110 sends the component devices and the design plans to production company 120 with a request to produce modules.

Production company 120 may also be a tier 1 company that can implement the design plans received from system-level designer 110. Production company 120 assembles the component devices received from system-level designer 110 into a first set of modules. System-level designer 110 can request that production company 120 assemble the modules for various reasons. For example, system-level designer 110 may not have an assembly facility for producing modules, or system-level designer 110 may operate an assembly facility that is at capacity and cannot increase production.

Production company 120 can build a module by assembling components (e.g., the component devices from system-level designer 110) and writing data to the memory on one or more of the components. For example, production company 120 may use a programming tool created by manufacturer 100 to write data to the respective memory on each of the component devices. The programming tool may be part of an external device that connects to one of the component devices, or one of the component devices may implement the programming tool after the programming instructions are loaded onto that device.

Referring to line 144, after building the first set of modules using the component devices, production company 120 delivers the first set of modules back to system-level designer 110. After delivering the modules, production company 120 may still retain the design plans that production company 120 used to build the modules. Referring to line 146, after receiving the delivery, system-level designer 110 sells the modules to user 130A. Users 130A-130K may be system integrators who assemble modules into larger systems such as automobiles, aircraft, building systems, and/or industrial facilities.

Figure 2:
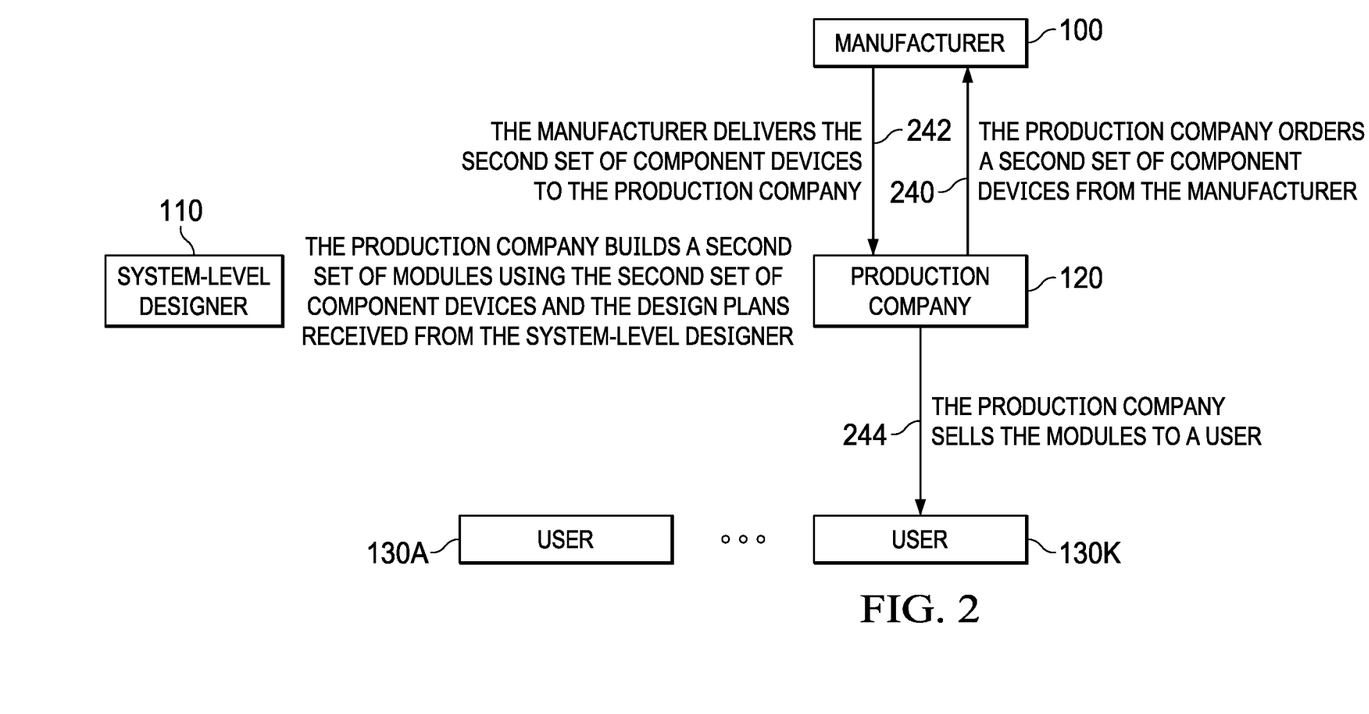
FIG. 2 is a conceptual block diagram of a production environment that includes a production company that builds modules using design plans from a system-level designer and additional devices produced by a manufacturer.

FIG. 2 is a conceptual block diagram of a production environment that includes a production company 120 that builds modules using design plans from a system-level designer 110 and additional devices produced by a manufacturer 100. Referring to line 240, production company 120 orders a second, additional set of component devices from manufacturer 100 after receiving the design plans from system-level designer 110 that are functionally identical to the first set of component devices. In that regard, production company 120 may order the same device model as the first set of component devices that production company 120 received from system-level designer 110. In the example shown in FIG. 2, production company 120 intends to produce a second set of cloned modules that are identical to the first set of modules, even though the contract between system-level designer 110 and production company 120 prohibits the production of cloned modules. Referring to line 242, manufacturer 100 may deliver the second set of component devices to production company 120 without knowledge of the intended use.

Production company 120 retained the design plans that production company 120 received from system-level designer 110. The design plans include application data to be written to memory on the component devices that production company 120 received from system-level designer 110. The application data may be the intellectual property of system-level designer 110. For example, system-level designer 110 may be protecting the application data as a trade secret, and production company 120 and system-level designer 110 may have signed a non-disclosure agreement covering the application data. Nonetheless, production company 120 uses the design plans to build a second set of modules, where each module includes one or more of the second set of component devices that production company 120 received from manufacturer 100. Each module of the second set of modules may be identical or nearly identical to the modules of the first set that production company 120 produced for system-level designer 110, as shown in FIG. 1. Thus, the second set of modules may be referred to as cloned modules or unauthorized copies of the first set of modules. Referring to line 244, production company 120 then sells the modules to user 130K.

In the example shown in FIG. 2, production company 120 is able to produce cloned modules because each device in the second set of component devices received by production company 120 from manufacturer 100 is functionally identical to the devices in the first set of component devices that system-level designer 110 received from manufacturer 100. Production company 120 can use the design plans from system-level designer 110 to create cloned modules, in part, because production company 120 can write, to the second set of component devices, the application data that was used for the first set of component devices. In other words, production company 120 misuses the application data received from system-level designer 110 to produce unauthorized clones for sale to user 130K.

In accordance with the techniques of this disclosure, manufacturer 100 can prevent or deter unauthorized cloning by writing a customer identification value to a respective memory on each of the component devices that manufacturer 100 delivers to system-level designer 110. The customer identification value may be unique to the first set of component devices such that other devices produced by manufacturer 100 and delivered to other customers have different customer identification values or no customer identification value at all. Thus, the first set of component devices received by system-level designer 110 from manufacturer 100 are different from the second set of component devices received by production company 120 from manufacturer 100, which may prevent production company 120 from misusing the application data received from system-level designer 110. However, because the component devices vary only by customer identification value and not by function, it may be possible for the manufacturer 100 to provide the component device to a wide range of customers without significant additional testing.

To do so, manufacturer 100 can write a first customer identification value associated with system-level designer 110 to a respective write-protected memory on each of the first set of component devices. Manufacturer 100 can write a different customer identification value to a respective write-protected memory (e.g., a one-time programmable write-protected memory) on each of the second set of component devices that manufacturer 100 delivers to production company 120. Thus, the first set of component devices will be different from the second set of component devices in that the second set of component devices have a different customer identification value than the first set of component devices. Because the customer identification value(s) may be stored to write-protected memory, production company 120 may be unable to change the customer identification value stored on any of the devices.

In addition, production company 120 may be unable to write a particular set of data to the second set of component devices if the customer identification value stored on the second set of component devices does not match the customer identification value in the data to be written. For example, the design plans received by production company 120 can include a digitally signed certificate with a first field specifying a customer identification value and one or more additional fields with data to be written to the first set of component devices. As used herein, "first field" and "second field" are not meant to indicate the positions of the fields within the certificate. Thus, a first field is not necessarily at the beginning of the certificate, and a second field is not necessarily immediately following the first field.

Production company 120 may use a programming tool to write the application data to one of the second set of component devices, where the programming tool is configured to compare a first customer identification value stored on the device to a second customer identification value in the certificate. In response to determining that the first customer identification value stored on the device does not match the second customer identification value in the certificate, the programming tool may be configured to refrain from writing the application data to the device.

The second customer identification value may be digitally signed and encrypted in the certificate so that production company 120 cannot change the customer identification value in the certificate without modifying (e.g., corrupting) other portions of the certificate. The certificate may also include one or more fields comprising some or all of the application data that production company 120 intends to write to the device. If production company 120 attempts to modify the customer identification value in the certificate, production company 120 will corrupt the remaining data in the certificate because of the digital signature and encryption. Thus, the customer identification values stored on the device and in the certificate, along with the programming tool, ensure that production company 120 cannot clone the first set of modules ordered by system-level designer 110.

In some examples, system-level designer 110 digitally signs and encrypts the certificate using an asymmetric key pair (e.g., public-key cryptography) and/or a hash function. For example, system-level designer 110 can digitally sign and encrypt the certificate by generating a hash of the contents of the certificate and encrypting the hash using a key. The encrypted hash is then included in the digitally signed certificate. System-level designer 110 may use the customer identification value stored on each of the first set of component devices as the public key, and system-level designer 110 may have a second key that is unknown to manufacturer 100 and production company 120. System-level designer 110 can create a field in the certificate for the customer identification value stored on each of the first set of component devices. System-level designer 110 may then generate the certificate by signing the certificate using the second key.

To verify that the certificate matches the customer identification value stored on the device, the programming tool may need only the public key (e.g., the customer identification value stored on the device) and the signed certificate. Access to the public key, even without access to the second key, may be sufficient for the programming tool to verify the certificate.

Production company 120 cannot change the customer identification value in the signed certificate to match the customer identification value stored on each of the second set of component devices. Production company 120 may have the second set of component devices, the programming tool, and the design plans including a certificate with application data. However, production company 120 cannot write the application data to the second set of component devices unless the programming tool confirms that the customer identification values are identical.

There are other approaches to prevent cloning by malicious entities. For example, another manufacturer may have access to the key of a customer. The manufacturer can build a programming tool that decrypts a certificate based on the key. Although this approach can provide similar benefits, the manufacturer is responsible for maintaining the secrecy of the key, which can result in increased cost and risk for the manufacturer. In such an example, the manufacturer may need to maintain the secrecy of the key throughout the lifetime of the device.

As another possible approach, a manufacturer may associate incremental serial numbers with a batch of devices and deliver specific serials numbers to each customer. Such an approach may increase the overhead costs of the manufacturer in maintaining a database associating device types and serial numbers that have been delivered to each customer. In addition, such an approach may increase the overhead costs of each customer in generating a unique certificate for every serial number within a batch of devices.

In contrast to these approaches, using the techniques of this disclosure, manufacturer 100 can maintain a much smaller database that associates each customer identification value with a customer or a specific product line of that customer. These techniques may also allow for each customer to generate only one certificate for each product line. Thus, the techniques of this disclosure may result in lower overhead costs for manufacturer 100 and for system-level designer 110, as compared to associating incremental serial numbers with each customer.

Figure 3:
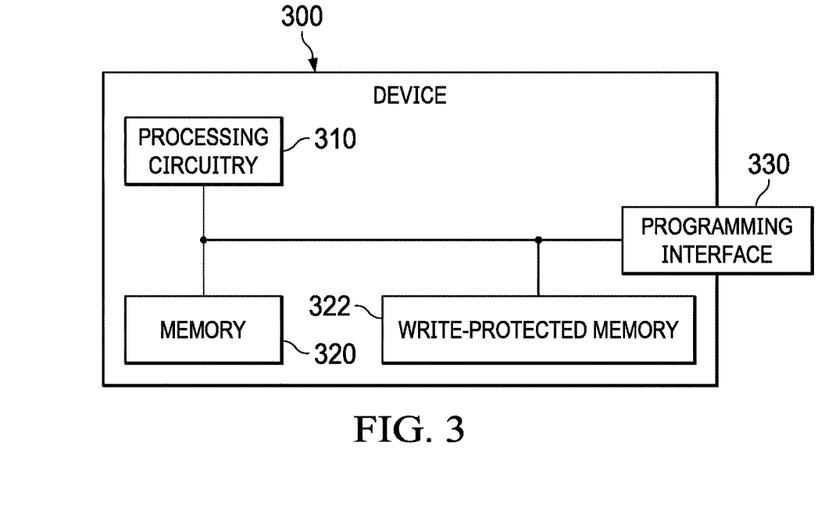
FIG. 3 is a conceptual block diagram of a device including a write-protected memory configured to store a customer identification value according to some aspects of the present disclosure.

FIG. 3 is a conceptual block diagram of a device 300 including a write-protected memory 322 configured to store a customer identification value according to some aspects of the present disclosure. In the example shown in FIG. 3, device 300 includes processing circuitry 310, memory 320, write-protected memory 322, and programming interface 330. In some examples, device 300 may include more or fewer components than the elements shown in FIG. 3. In addition, some of the elements in FIG. 3 may be integrated such that write-protected memory 322 is part of memory 320, or some or all of memory 320 is built into processing circuitry 310.

Write-protected memory 322 is configured to store a customer identification value associated with the customer who ordered device 300. The manufacturer of device 300 can write the customer identification value to write-protected memory 322 after device 300 is fabricated. Write-protected memory 322 may include a set of electronic fuses (e.g., efuses), a set of hardwired memory cells, and/or another type of write-protected memory 322 that cannot be reprogrammed or written over (e.g., one-time programmable memory). In examples in which write-protected memory 322 includes fuses, the manufacturer can blow the fuses during the write process to create non-reversible writing of the customer identification value. Alternatively, write-protected memory 322 may support more than one write operation with protection against unauthorized writing.

A programming tool can write the application data to a non-volatile memory on the device. Write-protected memory 322 may include non-volatile memory, such as backup flash memory and/or a fuse farm. The data stored in write-protected memory 322 may be visible or accessible to a user of device 300. In some examples, the customer identification value is a public key, so the customer identification value stored in write-protected memory 322, by itself, may not be enough information for a production company to produce cloned modules.

Programming interface 330 may include a serial interface, a parallel interface, one or more pins, a boot interface, and/or a universal asynchronous receiver-transmitter (UART) interface. Programming interface 330 may be configured to allow a programming tool to read data from memory 320 or 322 and/or to allow the programming tool to write application data to device 300. The programming tool can connect to device 300 via programming interface 330 to read the customer identification value stored to write-protected memory 322.

Figure 4:
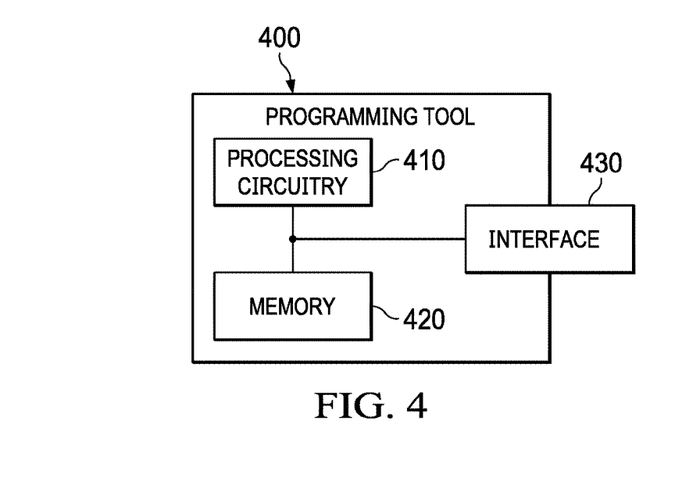
FIG. 4 is a conceptual block diagram of a programming tool according to some aspects of the present disclosure.

FIG. 4 is a conceptual block diagram of a programming tool 400 according to some aspects of the present disclosure. In the example shown in FIG. 4, programming tool 400 includes processing circuitry 410, memory 420, and interface 430. Programming tool 400 is shown in FIG. 4 as a physical device that is separate from the device to be programmed, but alternatively programming tool 400 may be embodied in instructions that are loaded onto the device to be programmed and executed therefrom. In other words, although programming tool 400 is depicted in FIG. 4 as external to the electronic device to which application data is written, instead or additionally, programming tool 400 may be embodied in instructions that are loaded on the electronic device and implemented through the processing circuitry of the electronic device.

When programming tool 400 is connected to or loaded onto a device via interface 430 (e.g., a UART interface), programming tool 400 may be configured to read a first customer identification value from a memory on the device (e.g., from a one-time programmable write-protected memory on the device). In examples in which programming tool 400 is a separate device, programming tool 400 can read the first customer identification value from the memory via interface 430. Programming tool 400 can copy the first customer identification value to a first register on the device. Programming tool 400 may be configured to then inspect the certificate, including the application images in the certificate. Programming tool 400 may be configured to authenticate or verify the digital signature of the certificate and interpret the fields in the certificate by first copying a second customer identification value from the certificate to a second register on the device. Programming tool 400 (e.g., processing circuitry 410) can compare the identification values to determine whether the values match by comparing the values in the first and second registers. After comparing the values, programming tool 400 may be configured to clear the values in the registers.

After programming tool 400 determines that the customer identification values are equal (e.g., by comparing the values in the registers), programming tool 400 writes the remaining data in the certificate to the device. In examples in which programming tool 400 is a separate device, programming tool 400 can write the remaining data to the device via interface 430. The data to be written to the device by programming tool 400 may include application images that are digitally signed and encrypted using a key. In response to determining that the customer identification values do not match, programming tool 400 may be configured to refrain from executing instructions to load the application data onto the device.

Programming tool 400 can be configured to program a family of devices produced by a single manufacturer. For example, the manufacturer may create programming tool 400 for a family of microprocessors and/or a family of DSPs produced by the manufacturer. The manufacturer can provide programming tool 400 to customers who purchase any of these products. Programming tool 400 may be constructed such that a customer cannot reverse engineer programming tool 400 to obtain unencrypted application data from a certificate. Thus, even though a malicious entity can write application data to device when the customer identification values match, the malicious entity may not be able to obtain an unencrypted version of the application data.

Figure 5:
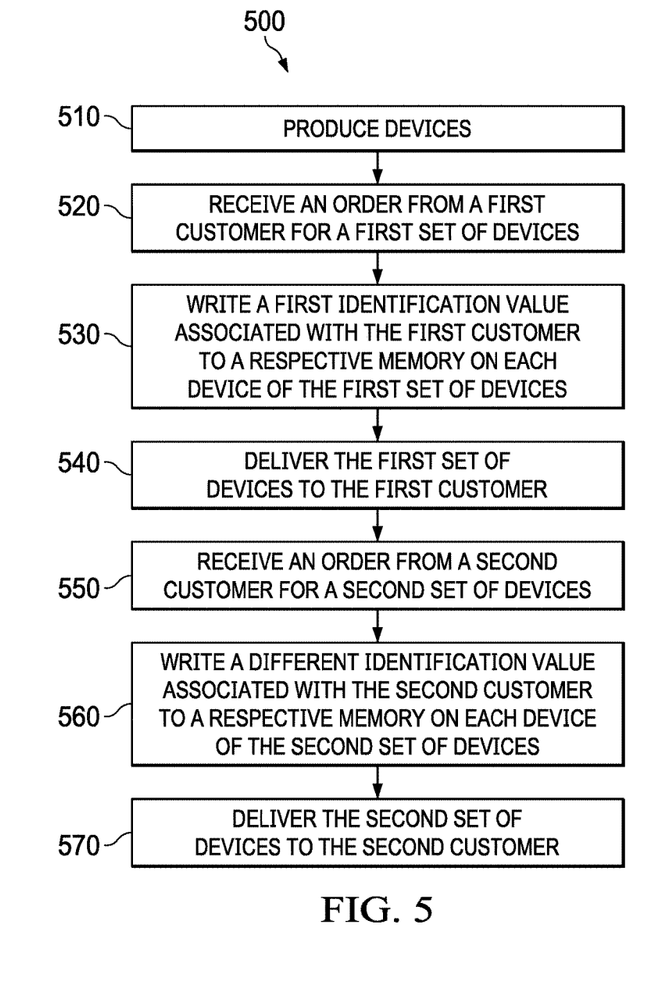
FIG. 5 is a flow diagram of a method for producing devices with different customer identification values according to some aspects of the present disclosure.

FIG. 5 is a flow diagram of a method 500 for producing devices with different customer identification values according to some aspects of the present disclosure. Some processes of the method 500 may be performed in orders other than described, and many processes may be performed concurrently in parallel. Furthermore, processes of the method 500 may be omitted or substituted in some examples of the present disclosure. The method 500 is described with reference to manufacturer 100 shown in FIGS. 1 and 2, although other entities or components may exemplify similar techniques.

Referring to block 510, manufacturer 100 produces devices, such as microprocessors, DSPs, field-programmable gate arrays (FPGAs), and/or any other electronic devices. Each of the devices produced by manufacturer 100 may include a write-protected memory.

Referring to block 520, manufacturer 100 then receives an order from a first customer (e.g., system-level designer 110) for a first set of component devices. Manufacturer 100 can create a first identification value and associate that value with the first customer in a database of manufacturer 100. In some examples, manufacturer 100 associates the first customer identification value with a specific product line of the first customer. In such examples, manufacturer 100 may associate a first customer identification value with a first product line of the first customer and may associate another customer identification value with a second product line of the first customer. Although this disclosure describes a single identification value for all of the first set of component devices, manufacturer 100 may assign the first identification value to a first subset of the first set of component devices and assign another identification value to a second subset of the first set of component devices.

Referring to block 530, in response to receiving the order from the first customer, manufacturer 100 writes the first identification value associated with the first customer to a respective memory on each of the first set of component devices. The first identification value may be associated with the first customer, with a specific product line of the first customer, or with a particular order placed by the first customer. Manufacturer 100 can write the first identification value to a write-protected memory by, for example, blowing fuses in the write-protected memory to create non-reversible writing. Manufacturer 100 can write the first identification value as unencrypted data that is visible to or readable by a user.

Referring to block 540, manufacturer 100 then delivers the first set of component devices to the first customer. Manufacturer 100 may arrange for a transport company to deliver the first set of component devices to the first customer. For example, manufacturer 100 can pay the transport company and provide a delivery address for the first customer to the transport company.

Referring to block 550, manufacturer 100 receives an order from a second customer (e.g., production company 120) for a second set of component devices. Manufacturer 100 can create an identification value that is different from the first identification value, and manufacturer 100 can associate that different value with the second customer in a database of manufacturer 100. Referring to block 560, in response to receiving the order from the second customer, manufacturer 100 writes the different identification value associated with the second customer to a respective memory on each of the second set of component devices. Referring to block 570, manufacturer 100 then delivers the second set of component devices to the second customer.

If the manufacturer wrote the same customer identification value on all of the component devices in both sets, the second customer could produce copycat modules using the design plans of the first customer. By writing a different customer identification value to each set of devices, manufacturer 100 can ensure that the second customer receives devices with a different customer identification value. For this reason, manufacturer 100 may restrict the number of devices that store each unique customer identification value. The first customer can digitally sign and encrypt its design plans using the first customer identification value and a key, which may prevent the second customer from using a programming tool to write application data received from the first customer to the devices ordered by the second customer.

Figure 6:
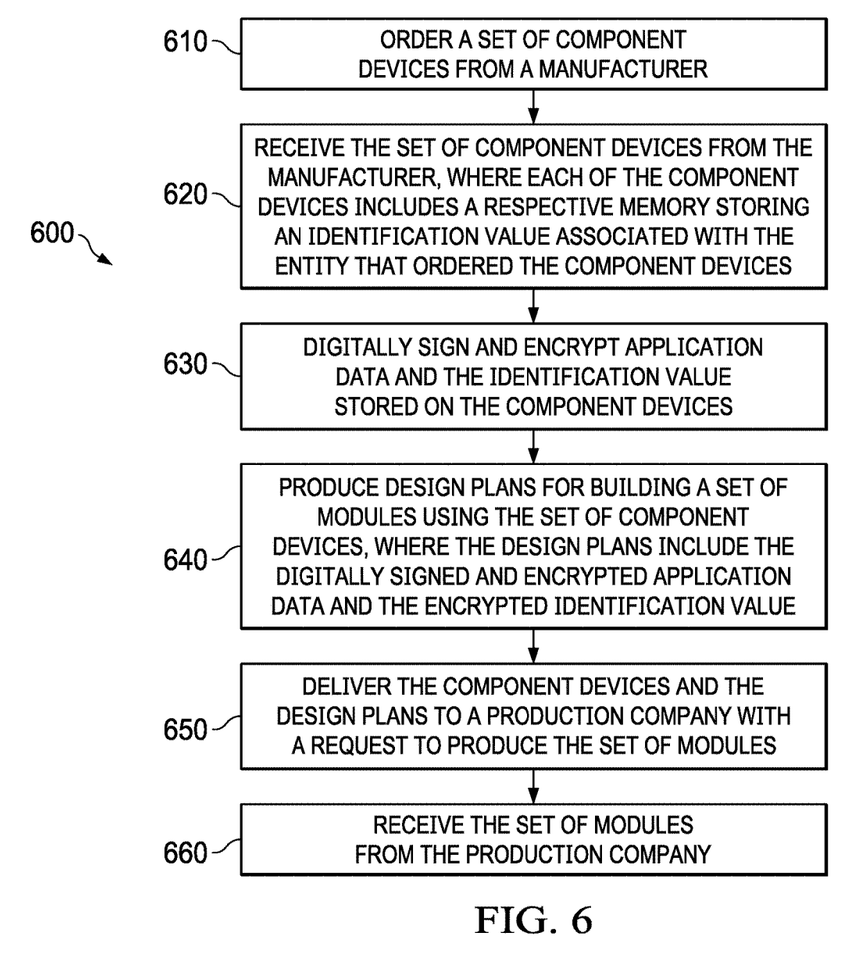
FIG. 6 is a flow diagram of a method for producing design plans for modules according to some aspects of the present disclosure.

FIG. 6 is a flow diagram of a method 600 for producing design plans for modules according to some aspects of the present disclosure. Some processes of the method 600 may be performed in orders other than described, and many processes may be performed concurrently in parallel. Furthermore, processes of the method 600 may be omitted or substituted in some examples of the present disclosure. The method 600 is described with reference to system-level designer 110 shown in FIGS. 1 and 2, although other entities or components may exemplify similar techniques.

Referring to block 610, system-level designer 110 orders a set of component devices from manufacturer 100. Referring to block 620, system-level designer 110 then receives the set of component devices from manufacturer 100, where each of the set of component devices includes a respective memory storing an identification value associated with system-level designer 110. In some examples, the identification value is stored to a write-protected memory onboard each of the set of component devices. System-level designer 110 may receive the identification value directly from manufacturer 100, or system-level designer 110 can read the identification value from the memory onboard on any of the set of component devices.

Referring to block 630, system-level designer 110 digitally signs and encrypts application data and the identification value that is stored on each of the set of component devices. System-level designer 110 can use the identification value as a public key to encrypt the application data into a certificate, and system-level designer 110 can use a key to sign the certificate. Referring to block 640, system-level designer 110 produces design plans for building a set of modules using the set of component devices, where the design plans include the digitally signed and encrypted application data and the digitally signed encrypted identification value. The application data may include one or more customer keys used by system level designer 110 to ensure that the program code only runs on authorized modules. The application data may also include programs and instructions that can be written to a respective memory on each of the set of component devices.

System-level designer 110 can digitally sign and encrypt the certificate using the first customer identification value in a manner that production company 120 is unable to read. If production company 120 can decrypt the certificate without a programming tool, production company 120 can write the application data to a blank device. Referring to block 650, system-level designer 110 delivers the set of component devices and the design plans to production company 120 with a request to produce a set of modules. Production company 120 can assemble each device into a module based on the design plans.

Referring to block 660, system-level designer 110 later receives the set of modules from production company 120. System-level designer 110 expects to receive a specific number of modules after previously sending the set of component devices to production company 120. Delivery by production company 120 of fewer than the expected number of modules would be a red flag to system-level designer 110 that production company 120 retained some of the component devices for cloning.

Figure 7:
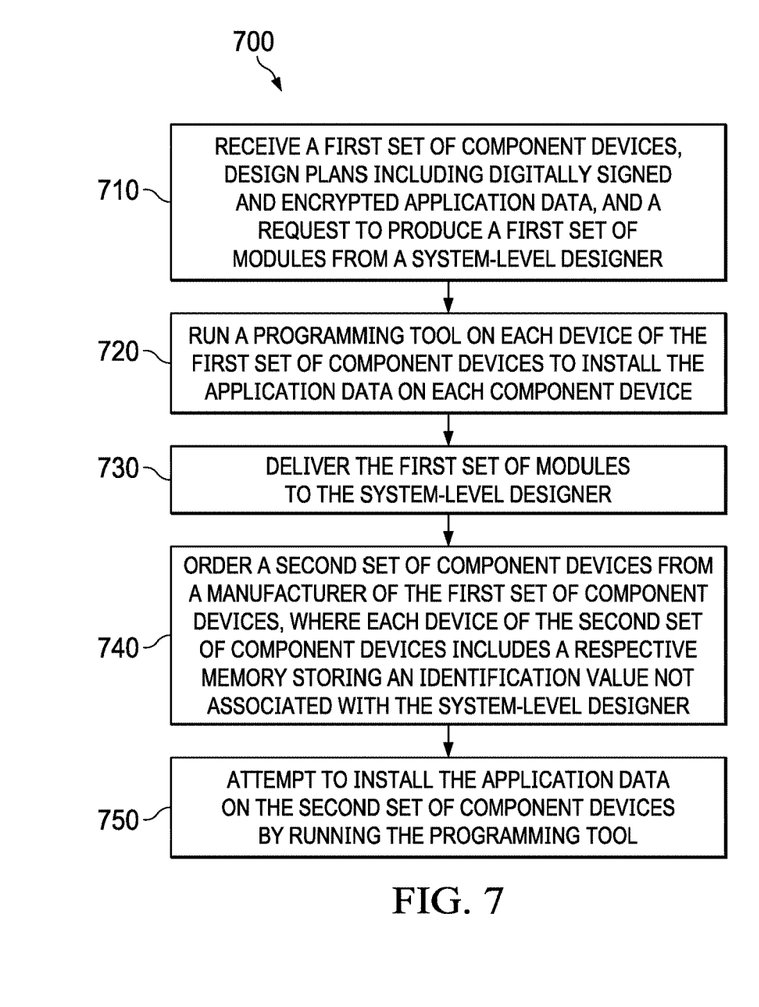
FIG. 7 is a flow diagram of a method for attempting to produce cloned modules.

FIG. 7 is a flow diagram of a method 700 for attempting to produce cloned modules. Some processes of the method 700 may be performed in orders other than described, and many processes may be performed concurrently in parallel. Furthermore, processes of the method 700 may be omitted or substituted in some examples of the present disclosure. The method 700 is described with reference to production company 120 shown in FIGS. 1 and 2, although other entities or components may exemplify similar techniques.

Referring to block 710, production company 120 receives a first set of component devices, design plans including the digitally signed and encrypted application data, and a request from system-level designer 110 to produce a first set of modules. System-level designer 110 may request that production company 120 write the application data to each of the component devices. System-level designer 110 may also request that production company 120 assemble each of the component devices into a respective module. The design plans can include a digitally signed and encrypted certificate comprising the application data and a customer identification value.

Referring to block 720, production company 120 runs a programming tool on each of the component devices to install the application data on each device. The programming tool may be provided by the manufacturer 100 to customers and users for installing software on devices made by manufacturer 100. In some examples, production company 120 runs the programming tool by connecting the programming tool to each of the component devices, while the certificate may be stored on an external memory (e.g., a serial data flash). Additionally or alternatively, production company 120 may load the programming tool instructions into a respective memory of each of the component devices, where the respective processing circuitry of each of the component devices executes the programming tool instructions. Production company 120 may also load the digitally signed and encrypted certificate into the respective memory of each of the component devices for authentication and decryption by the programming tool. Referring to block 730, production company 120 then delivers a first set of modules to system-level designer 110, where each of the first set of modules includes one or more of the component devices.

Referring to block 740, production company 120 orders a second set of component devices from manufacturer 100, where each of the second set of component devices includes a respective memory storing an identification value not associated with system-level designer 110. Referring to block 750, production company 120 attempts to install the application data on the second set of component devices by running the programming tool. The second set of component devices may have the same model number as the first set of component devices and be otherwise identical, except for the customer identification value stored in each of the devices. If the customer identification value stored in the second set of component devices is different from the customer identification value stored in the first set of component devices, the programming tool may not write the application data to the second set of component devices.

Production company 120 can attempt to change the customer identification value in the first field of the certificate. However, this change may render portions of the certificate unusable. For example, the programming tool may determine that the customer identification value in the first field of the certificate does not match the customer identification value stored in the write-protected memory of one of the second set of component devices. Even if production company 120 is able to change the customer identification value in the first field of the certificate to match the customer identification value stored on one of the second set of component devices, this change may corrupt other data in the certificate. This corruption may render the application data in the certificate unusable.

Figure 8:
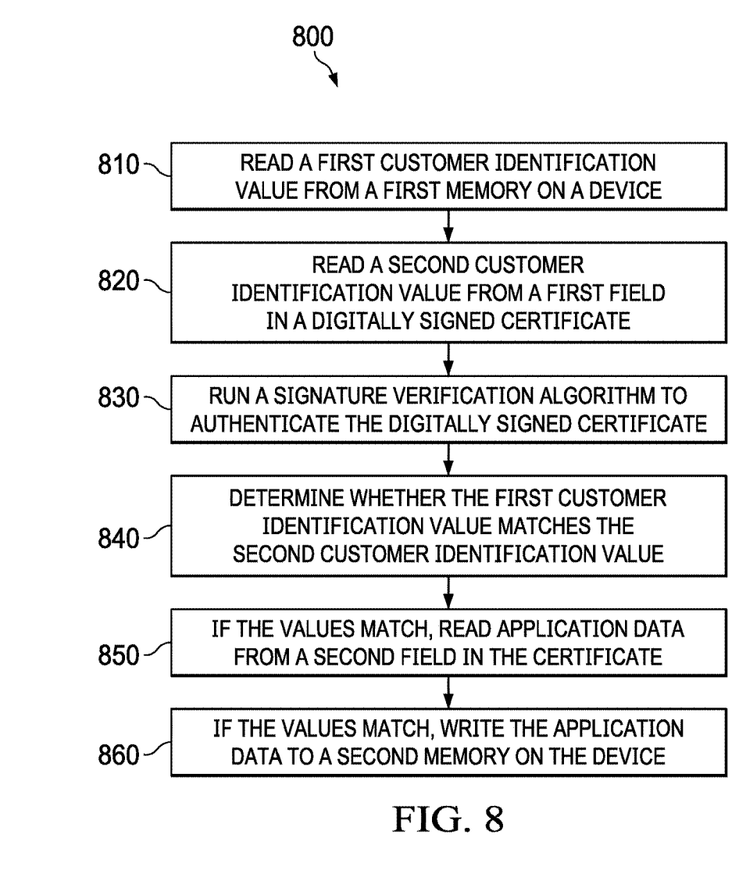
FIG. 8 is a flow diagram of a method for authenticating a certificate before writing application data according to some aspects of the present disclosure.

FIG. 8 is a flow diagram of a method 800 for authenticating a certificate before writing application data according to some aspects of the present disclosure. Some processes of the method 800 may be performed in orders other than described, and many processes may be performed concurrently in parallel. Furthermore, processes of the method 800 may be omitted or substituted in some examples of the present disclosure. The method 800 is described with reference to programming tool 400 shown in FIG. 4, although other entities or components may exemplify similar techniques.

Referring to block 810, programming tool 400 reads a first customer identification value from a first memory on a device. The first memory may be a write-protected memory that stores a version of the first customer identification value. Referring to block 820, programming tool 400 also reads a second customer identification value from a first field in a certificate. Programming tool 400 can read the first field of the certificate after loading the certificate onto the device and authenticating and decrypting the certificate. Additionally or alternatively, programming tool 400 can read the first field of the certificate from a memory outside of the device. Programming tool 400 may be configured to run a signature verification sequence in order to determine the second customer identification value. For example, programming tool 400 can re-compute the hash of the contents of the certificate, decrypt the signature using the public key, and compare the re-computed hash and the decrypted signature for a match.

Programming tool 400 may be configured to decrypt the certificate using the first customer identification value in a manner that a user is unable to accomplish without programming tool 400. If a user could decrypt the certificate without programming tool 400, a malicious user could obtain the application data from the certificate and write the application data to a blank device.

Referring to block 830, programming tool 400 runs a signature verification algorithm to authenticate the digitally signed certificate. To verify the signature, programming tool 400 may be configured to re-compute a hash of the contents of the certificate. Programming tool 400 may be configured to also decrypt the signature using the public key. Referring to block 840, programming tool 400 determines whether the first customer identification value matches the second customer identification value. For example, programming tool 400 can load the customer identification values into registers and compare the two values. If the customer identification values do not match, the signature verification performed by programming tool 400 may fail. Referring to blocks 850 and 860, if programming tool 400 determines that the customer identification values match, programming tool 400 reads the application data from a second field in the certificate and writes the application data to a second memory on the device.

If programming tool 400 determines that the customer identification values do not match, programming tool 400 may be configured to refrain from reading the application data from the certificate and writing the application data to the device. For example, programming tool 400 can output a message to the user that the customer identification values do not match and then cease operation. Additionally or alternatively, programming tool 400 may be configured to output an alert, for example, to a user or manufacturer 100 in response to determining that the customer identification values do not match. Programming tool 400 may be configured to establish a communication channel with manufacturer 100 (e.g., via a wireless internet connection) to provide the customer identification value stored on the device to manufacturer 100.

The following numbered aspects demonstrate one or more aspects of the disclosure.

Aspect 1. A method includes reading a first customer identification value from a first memory on a device and reading a second customer identification value from a first field in a certificate. The method also includes determining whether the first customer identification value matches the second customer identification value. In addition, the method includes reading application data from a second field in the certificate in response to determining that the first customer identification value matches the second customer identification value. The method further includes writing the application data to a second memory on the device in response to determining that the first customer identification value matches the second customer identification value.

Aspect 2. The method of the preceding aspect, where the device is a first device, and the method further includes reading a third customer identification value from a third memory on a second device.

Aspect 3. The method of the preceding aspects or any combination thereof, where the certificate is a first certificate, and the method further includes reading a fourth customer identification value from a third field in a second certificate.

Aspect 4. The method of the preceding aspects, further including determining that the third customer identification value matches the fourth customer identification value.

Aspect 5. The method of aspect 3 or aspect 4, further including responsive to determining that the third customer identification value does not match the fourth customer identification value, refraining from writing application data from the second certificate to the third memory.

Aspect 6. The method of aspects 3-5 or any combination thereof, further including responsive to determining that the third customer identification value does not match the fourth customer identification value, outputting an alert.

Aspect 7. The method of the preceding aspects or any combination thereof, where reading the second customer identification value comprises decrypting the second customer identification value from the first field based on the first customer identification value.

Aspect 8. The method of the preceding aspects or any combination thereof, where reading the application data comprises decrypting the application data from the second field based on the first customer identification value.

Aspect 9. The method of the preceding aspects or any combination thereof, where reading the first customer identification value comprises reading the first customer identification value from a write-protected memory in the device.

Aspect 10. The method of the preceding aspects or any combination thereof, where reading the first customer identification value comprises reading the first customer identification value from a set of fuses in the device.

Aspect 11. The method of the preceding aspects or any combination thereof, where reading the first customer identification value comprises reading an unencrypted value from the first memory.

Aspect 12. The method of the preceding aspects or any combination thereof, further including computing a hash of the certificate.

Aspect 13. The method of the preceding aspects or any combination thereof, further including decrypting a signature of the certificate using the first customer identification value.

Aspect 14. The method of the preceding aspect, where determining that the first customer identification value matches the second customer identification value comprises comparing the hash of the certificate and the decrypted signature.

Aspect 15. The method of the preceding aspects or any combination thereof, where writing the application data comprises writing the application data to the second memory via a boot interface of the device.

Aspect 16. The method of the preceding aspects or any combination thereof, where writing the application data comprises writing the application data to the second memory via a universal asynchronous receiver-transmitter interface of the device.

Aspect 17. A computing system includes a processing resource and a non-transitory computer-readable medium coupled to the processing resource and storing instructions that, when executed by the processing resource, cause the processing resource to read a first customer identification value from a first memory on a device. The instructions are configured to be executable by the processing resource for further causing the processing resource to read a second customer identification value from a first field in a certificate and determine whether the first customer identification value matches the second customer identification value. In addition, the instructions are configured to be executable by the processing resource for also causing the processing resource to determine whether the first customer identification value matches the second customer identification value. The instructions are configured to be executable by the processing resource for also causing the processing resource to, responsive to determining that the first customer identification value matches the second customer identification value, read application data from a second field in the certificate and write the application data to a second memory on the device.

Aspect 18. The computing system of the preceding aspect, where the instructions are configured to be executable by the processing resource for further causing the processing resource to refrain from writing application data from the certificate to the second memory responsive to determining that the first customer identification value does not match the second customer identification value.

Aspect 19. The computing system of aspect 17 or aspect 18, where the instructions to read the first customer identification value comprise instructions to read the first customer identification value from a write-protected memory in the device.

Aspect 20. The computing system of aspects 17-19 or any combination thereof, where the instructions to read the first customer identification value comprise instructions to read the first customer identification value from a set of fuses in the device.

Aspect 21. The computing system of aspects 17-20 or any combination thereof, where the instructions to read the second customer identification value comprise instructions to decrypt the second customer identification value from the first field based on the first customer identification value.

Aspect 22. The computing system of aspects 17-21 or any combination thereof, where the instructions to read the application data comprise instructions to decrypt the application data from the second field based on the first customer identification value.

Aspect 23. The computing system of aspects 17-22 or any combination thereof, where the instructions to read the first customer identification value comprise instructions to read an unencrypted value from the first memory.

Aspect 24. The computing system of aspects 17-23 or any combination thereof, where the instructions are configured to be executable by the processing resource for further causing the processing resource to compute a hash of the certificate.

Aspect 25. The computing system of aspects 17-24 or any combination thereof, where the instructions are configured to be executable by the processing resource for further causing the processing resource to decrypt a signature of the certificate using the first customer identification value.

Aspect 26. The computing system of aspect 25, where the instructions to determine that the first customer identification value matches the second customer identification value comprise instructions to compare the hash of the certificate and the decrypted signature.

Aspect 27. The computing system of aspects 17-26 or any combination thereof, where the instructions to write the application data comprise instructions to write the application data to the second memory via a boot interface of the device.

Aspect 28. The computing system of aspects 17-27 or any combination thereof, where the instructions to write the application data comprise instructions to write the application data to the second memory via a universal asynchronous receiver-transmitter interface of the device.

Aspect 29. The computing system of the preceding aspect, where the instructions are configured to be executable by the processing resource for further causing the processing resource to perform the method of aspects 1-16 or any combination thereof.

Aspect 30. A computing system includes means for reading a first customer identification value from a first memory on a device, means for reading a second customer identification value from a first field in a certificate, and means for determining whether the first customer identification value matches the second customer identification value. The computing system also includes means for reading application data from a second field in the certificate responsive to determining that the first customer identification value matches the second customer identification value. In addition, the computing system includes means for writing the application data to a second memory on the device responsive to determining that the first customer identification value matches the second customer identification value.

Aspect 31. The computing system of the preceding aspect, further including means for refraining from writing application data from the certificate to the second memory responsive to determining that the first customer identification value does not match the second customer identification value.

Aspect 32. The computing system of aspect 30 or aspect 31, further including means for computing a hash of the certificate.

Aspect 33. The computing system of aspects30-32 or any combination thereof, further including means for decrypting a signature of the certificate using the first customer identification value.

Aspect 34. The computing system of the preceding aspect, where the means for determining that the first customer identification value matches the second customer identification value comprise means for comparing the hash of the certificate and the decrypted signature.

Aspect 35. The computing system of the preceding aspect, further including means for performing the method of aspects 1-16 or any combination thereof.

This disclosure has attributed functionality to device 300, programming tool 400, processing circuitry 310 and 410, and memories 320, 322, and 420. Device 300, programming tool 400, processing circuitry 310 and 410, and memories 320, 322, and 420 may include one or more processors. Device 300, programming tool 400, processing circuitry 310 and 410, and memories 320, 322, and 420 may include any combination of integrated circuitry, discrete logic circuitry, analog circuitry, such as one or more microprocessors, microcontrollers, DSPs, application specific integrated circuits (ASICs), central processing units (CPUs), graphics processing units (GPUs), FPGAs, and/or any other processing resources. In some examples, device 300, programming tool 400, and processing circuitry 310 and 410 may include multiple components, such as any combination of the processing resources listed above, as well as other discrete or integrated logic circuitry, and/or analog circuitry.

The techniques described in this disclosure may also be embodied or encoded in an article of manufacture including a non-transitory computer-readable storage medium, such as memory 320, 322, and/or 420. Example non-transitory computer-readable storage media may include random access memory (RAM), read-only memory (ROM), programmable ROM (PROM), erasable programmable ROM (EPROM), electronically erasable programmable ROM (EEPROM), flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

It is understood that the present disclosure provides a number of exemplary embodiments and that modification are possible to these embodiments. Such modifications are expressly within the scope of this disclosure. Furthermore, application of these teachings to other environments, applications, and/or purposes is consistent with and contemplated by the present disclosure.

What is claimed is:

1. A method comprising:
    reading a first customer identification value from a first memory on a device;
    reading a second customer identification value from a first field in a certificate;
    determining that the first customer identification value matches the second customer identification value; and
    responsive to determining that the first customer identification value matches the second customer identification value:
        reading application data from a second field in the certificate; and
        writing the application data to a second memory on the device.

2. The method of claim 1,
    wherein the device is a first device,
    wherein the certificate is a first certificate, and
    wherein the method further comprises:
        reading a third customer identification value from a third memory on a second device;
        reading a fourth customer identification value from a third field in a second certificate;
        determining that the third customer identification value matches the fourth customer identification value; and
        responsive to determining that the third customer identification value does not match the fourth customer identification value, refraining from writing application data from the second certificate to the third memory.

3. The method of claim 1,
    wherein the device is a first device,
    wherein the certificate is a first certificate, and
    wherein the method further comprises:
        reading a third customer identification value from a third memory on a second device;
        reading a fourth customer identification value from a third field in a second certificate;
        determining whether the third customer identification value matches the fourth customer identification value; and
        responsive to determining that the third customer identification value does not match the fourth customer identification value, outputting an alert.

4. The method of claim 1, wherein reading the second customer identification value comprises decrypting the second customer identification value from the first field based on the first customer identification value.

5. The method of claim 1, wherein reading the application data comprises decrypting the application data from the second field based on the first customer identification value.

6. The method of claim 1, wherein reading the first customer identification value comprises reading the first customer identification value from a write-protected memory in the device.

7. The method of claim 6, wherein reading the first customer identification value comprises reading the first customer identification value from a set of fuses in the device.

8. The method of claim 1, wherein reading the first customer identification value comprises reading an unencrypted value from the first memory.

9. The method of claim 1, further comprising:
    computing a hash of the certificate; and
    decrypting a signature of the certificate using the first customer identification value,
    wherein determining that the first customer identification value matches the second customer identification value comprises comparing the hash of the certificate and the decrypted signature.

10. The method of claim 1, wherein writing the application data comprises writing the application data to the second memory via a boot interface of the device.

11. The method of claim 1, wherein writing the application data comprises writing the application data to the second memory via a universal asynchronous receiver-transmitter interface of the device.

12. A computing system comprising:
    a processing resource; and
    a non-transitory computer-readable medium coupled to the processing resource and storing instructions that, when executed by the processing resource, cause the processing resource to:
        read a first customer identification value from a first memory on a device;
        read a second customer identification value from a first field in a certificate;
        determine whether the first customer identification value matches the second customer identification value; and
        responsive to determining that the first customer identification value matches the second customer identification value:
            read application data from a second field in the certificate; and
            write the application data to a second memory on the device.

13. The computing system of claim 12, wherein the instructions are configured to be executable by the processing resource for further causing the processing resource to refrain from writing application data from the certificate to the second memory responsive to determining that the first customer identification value does not match the second customer identification value.

14. The computing system of claim 12, wherein the instructions to read the first customer identification value comprise instructions to read the first customer identification value from a write-protected memory in the device.

15. The computing system of claim 14, wherein reading the first customer identification value comprises reading the first customer identification value from a set of fuses in the device.

16. The computing system of claim 12, wherein the instructions to read the first customer identification value comprise instructions to read an unencrypted value from the first memory.

17. The computing system of claim 12, wherein the instructions are configured to be executable by the processing resource for further causing the processing resource to:

compute a hash of the certificate; and decrypt a signature of the certificate using the first customer identification value, wherein the instructions to determine that the first customer identification value matches the second customer identification value comprise instructions to compare the hash of the certificate and the decrypted signature.

18. A computing system comprising:

a programming tool including processing circuitry and configured to:

read a first customer identification value from a first memory on a device;

read a second customer identification value from a first field in a certificate;

determine whether the first customer identification value matches the second customer identification value;

read application data from a second field in the certificate responsive to determining that the first customer identification value matches the second customer identification value; and write the application data to a second memory on the device responsive to determining that the first customer identification value matches the second customer identification value.

19. The computing system of claim 18, wherein the programming tool is further configured to refrain from writing application data from the certificate to the second memory responsive to determining that the first customer identification value does not match the second customer identification value.

20. The computing system of claim 18, wherein the programming tool is further configured to:

compute a hash of the certificate;

decrypt a signature of the certificate using the first customer identification value; and compare the hash of the certificate and the decrypted signature.

* * * * *